United States Patent
Scarnato et al.

[15] 3,678,671
[45] July 25, 1972

[54] FLAIL SHREDDER

[72] Inventors: Thomas J. Scarnato, Barrington; James J. Dryan, Chicago; Craig M. Lawler, Downers Grove; Robert Sorensen, Glen Ellyn, all of Ill.

[73] Assignee: International Harvester Company, Chicago, Ill.

[22] Filed: Feb. 26, 1971

[21] Appl. No.: 119,373

Related U.S. Application Data

[63] Continuation of Ser. No. 781,332, Dec. 5, 1968, abandoned.

[52] U.S. Cl. ................................56/505, 56/294, 56/320.1
[51] Int. Cl. ..........................................................A01d 49/00
[58] Field of Search .................................56/12.7, 504–505, 56/294, 289, 320.1, 320.2

[56] References Cited

UNITED STATES PATENTS

| | | | |
|---|---|---|---|
| 2,974,472 | 3/1961 | Gebhart | 56/504 |
| 2,987,868 | 6/1961 | Cunningham | 56/504 |
| 2,999,346 | 9/1961 | Mathews | 56/505 X |
| 2,990,667 | 7/1961 | Schwalm | 56/294 |
| 3,035,393 | 5/1962 | Mathews | 56/505 |
| 3,050,927 | 8/1962 | Markham et al. | 56/504 |
| 3,084,493 | 5/1963 | Kucera | 56/504 X |
| 3,087,294 | 5/1963 | Kessler | 56/500 X |
| 3,177,640 | 5/1965 | Mott, Jr. | 56/504 X |
| 2,906,085 | 9/1959 | Lundell | 56/505 |
| 3,087,294 | 4/1963 | Kessler | 56/500 X |
| 3,122,871 | 3/1964 | Frevik et al. | 56/294 |
| 3,335,555 | 8/1967 | Woodring | 56/294 |
| 2,888,795 | 6/1959 | Lundell | 56/505 X |
| 3,035,393 | 5/1962 | Mathews | 56/505 |

FOREIGN PATENTS OR APPLICATIONS

| | | | |
|---|---|---|---|
| 1,057,371 | 2/1967 | Great Britain | 56/504 |
| 108,656 | 1/1968 | Denmark | 56/504 |

*Primary Examiner*—Louis G. Mancene
*Assistant Examiner*—James A. Oliff
*Attorney*—Floyd B. Harman

[57] ABSTRACT

A flail mower having a pair of coaxial rotors with units of multiple pairs of flail knives swingably mounted thereon in a helicoidal pattern wherein the knives of each unit are selectively accessible for quick removal, a rotor housing having an interior rotor-supporting partition disposed off center to fall between crop rows and said housing having a tear-drop configuration providing increasing clearances in the direction of flail knife rotation and crop flow, the rotors being driven by a tension-correcting belt drive arrangement effective to dampen shock loading, wherein the helicoidal pattern of knives in combination with the tear-drop housing configuration and the belt drive arrangement yield mower power output characteristics that demand minimal power input which together with the off-center arranged partition maximize field efficiency.

11 Claims, 9 Drawing Figures

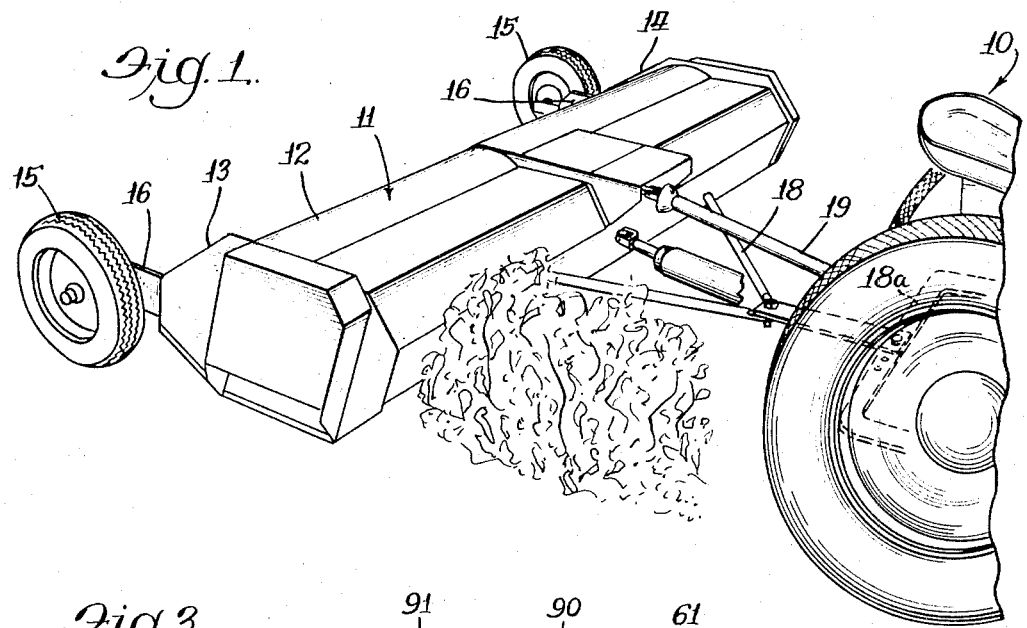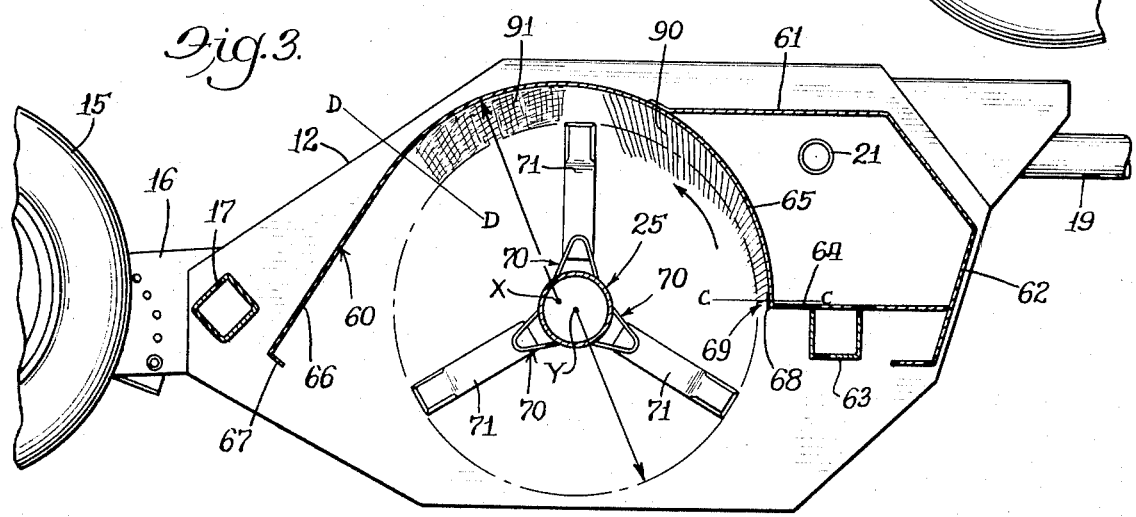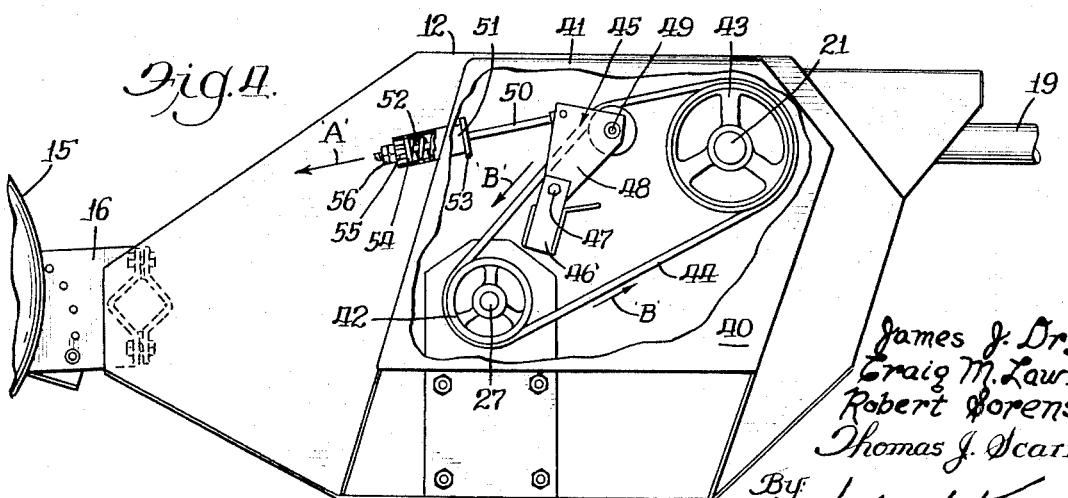

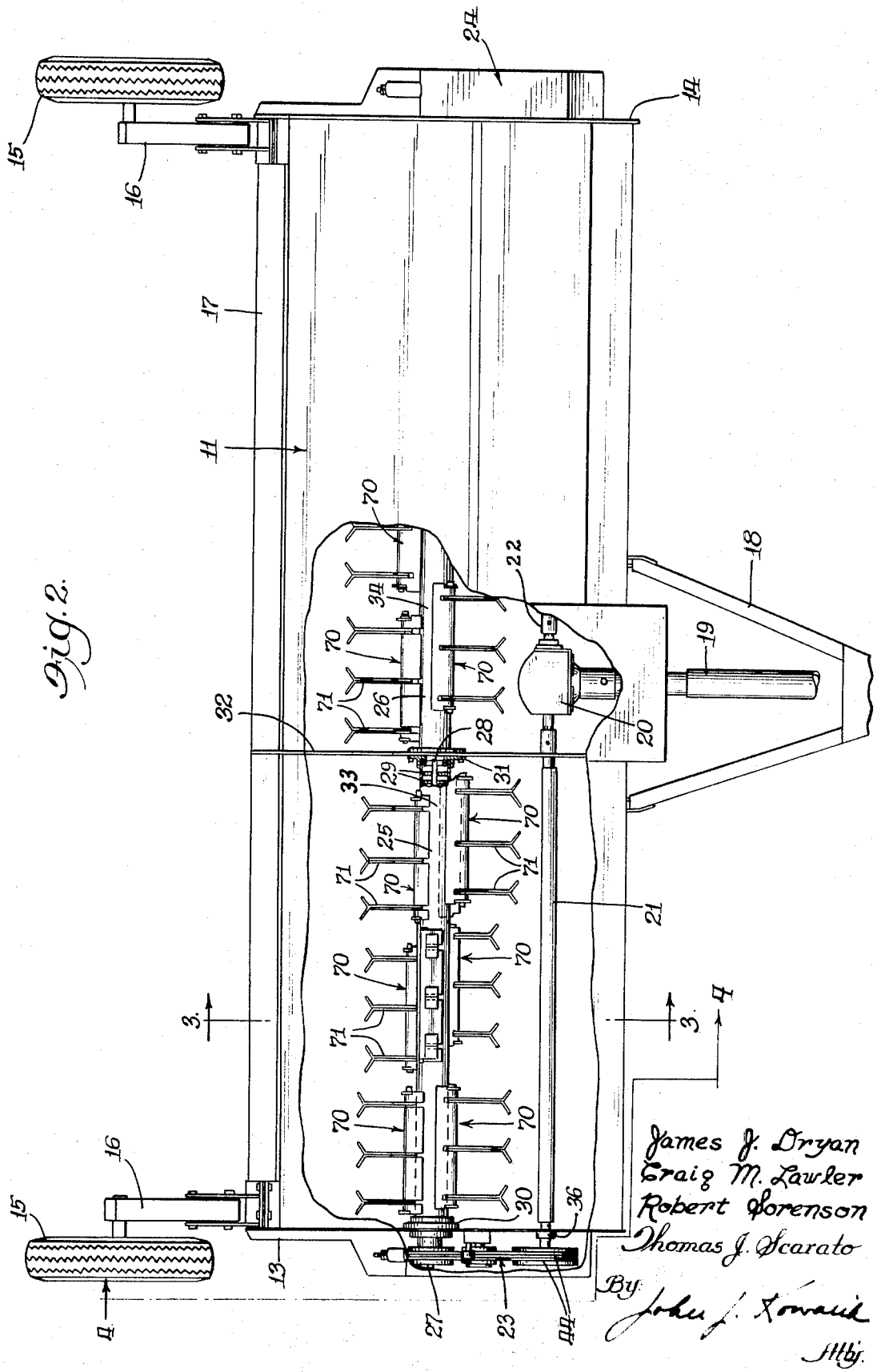

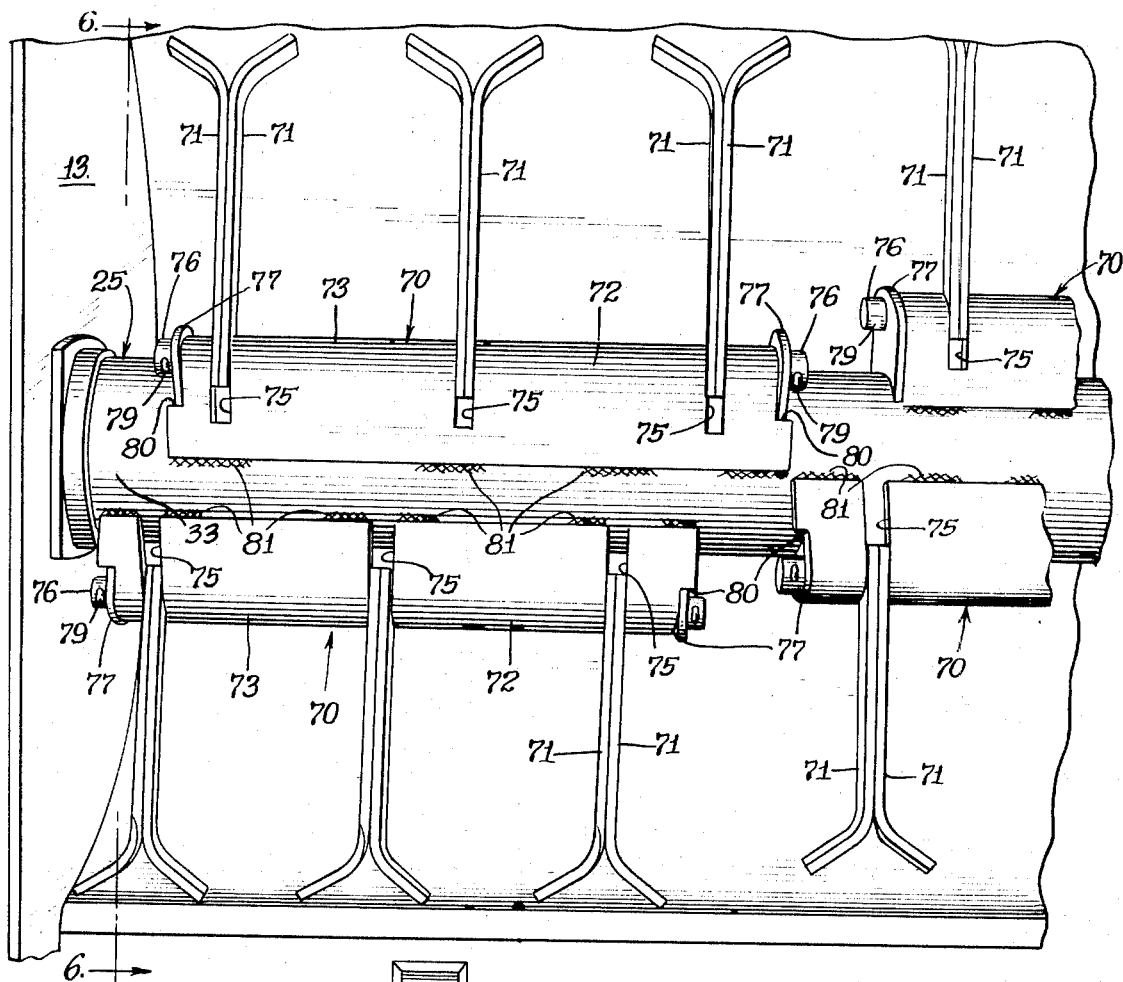
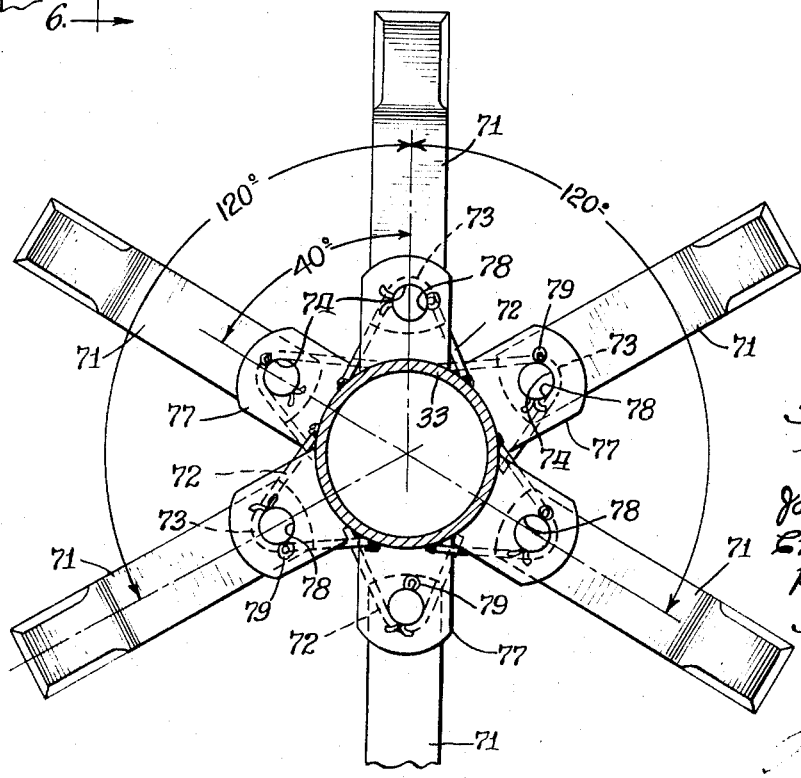

Patented July 25, 1972  3,678,671

James J. Bryan
Craig M. Lawler
Robert Sorenson
Thomas J. Scarnato
By
John J. Kowacik
Atty.

FLAIL SHREDDER

CROSS REFERENCE TO RELATED APPLICATIONS

This application is a streamlined continuation application of application Ser. No. 781,332 filed Dec. 5, 1968, and now abandoned.

BACKGROUND OF THE INVENTION

A shredding machine of the general character under consideration is primarily useful for comminuting field crop residues and scattering the same to leave fields easy to work for subsequent planting and tillage operations. Implements of this type are normally pulled and powered by a tractor, or the like, and therefore it is desirable that they be designed to demand minimum and substantially uniform horsepower requirements throughout an expected range of performance. One of the sought after characteristics of a well designed machine is that it will require minimal power input in relation to comminuting and distributing qualities and yet be capable of dampening shock and pulsating loads to minimize large peak power requirements. Efficiency as related to field operations and ease of maintenance are also considerations which make an implement commercially desirable. It has been found that heretofore commercially available shredding implements may excel in one feature but noticeably lack in other.

One of the problems encountered in an impact mowing machine such as the shredder is that the flails necessarily operate close to the ground and are subject to striking solid and immovable objects which, when such occurs, shock loads the mowers power system. Shock loads can also cause undesirable torsional wind-up of rotor when rotor lengths become excessive, such wind-up having a momentary effect of severely loading and then unloading the power system causing excessive pulsations therein.

Arrangement of the flail knives about the rotor can also produce pulsating power requirements particularly when they are axially aligned in rows with large circumferential spacing therebetween.

Since a housing must necessarily cover the rotor and provide a variety of functions its disposition and configuration with respect to the rotor is of prime importance. Factors such as crop shredding quality distribution characteristics and power consumption have been found to be controllable by the shape and design of the housing.

The instant invention has been developed with an eye to a balanced design concept wherein desirable characteristics hereinbefore mentioned along with others have been incorporated into a mower shredder by the embodiment of a combination of novel features to produce a machine having minimal power input characteristics with respect to the quality of crop shredding and distribution resulting in a practical machine of outstanding performance.

OBJECTS OF THE INVENTION

A principal object of the invention is to provide a mower shredder which will operate at more uniform power input and therefore require a prime mover having minimal power output capabilities.

A more specific object of the invention is to accomplish the foregoing object by the embodiment of a novel combination of cooperating features which include:
 a. using a pair of rotors having flail knives swingably attached thereto rather than a single rotor design;
 b. a rotor housing capable of quality crop comminution and distribution featuring increasing volumetric clearances relative to said knives in the direction of material flow to reduce power input requirements;
 c. an endless belt drive arrangement to drive each rotor, each drive having means to maintain uniform belt tension under varying conditions to dampen the effects of pulsating and shock loads and result in more uniform power usage characteristics.

Another object of the invention is to provide an intermediate rotor supporting partition with the housing which is disposed in spaced relation from the center of the housing to run between the rows of a row crop and thereby increase field efficiency by providing extra crop row coverage as distinguished from symmetrical current machines which must be offset and thus lose a row.

A still further object of the invention is to mount the flail knives in clusters on the rotor in an overlapping relationship wherein the clusters are arranged in a spiral pattern thereabout to effect a more continuous crop engagement to produce more uniform power usage characteristics.

Still another object of the invention is to provide a mounting for the flail knives in the form of an easily removable element which may be selectively repositioned to provide new wear surfaces.

BRIEF DESCRIPTION OF THE DRAWINGS

FIG. 1 is a perspective view of a field-going shredder embodying the instant invention;

FIG. 2 is a plan view of the shredder with housing portions cut away showing internal parts thereof;

FIG. 3 is an elevational view taken substantially at lines 3—3 of FIG. 2;

FIG. 4 is an elevational view of the drive housing having a portion cut away taken substantially at line 4—4 of FIG. 2;

FIG. 5 is a fragmentary view of the rotor showing clusters of flail knives attached thereto;

FIG. 6 is an elevational view of rotor taken substantially along line 6—6 of FIG. 5;

DESCRIPTION OF THE PREFERRED EMBODIMENT

Figure 7A:
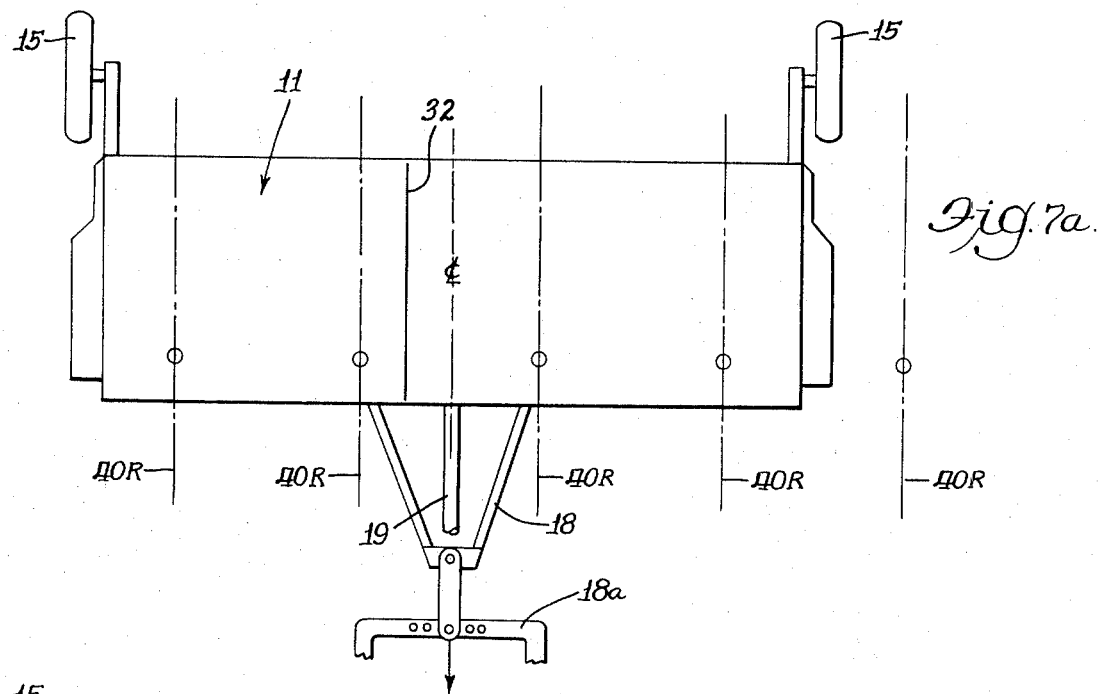
FIG. 7a is a diagrammatic plan view of the shredder shown field oriented in relation to 40 inch crop rows.

Referring in detail to the accompanying drawing, attention is directed to FIG. 1 showing a field-going tractor 10 drawing a mower shredder 11 embodying the novel features hereinafter disclosed.

The shredding implement 11 comprises a body 12 having laterally supporting side walls 13 and 14, and ground engaging trailing wheels 15, each rotatably mounted on an adjustable carriage 16. A transverse frame member 17 affixed between the walls 13 and 14 on the rear portions thereof support the carriages 16 which adjustably clamp thereto and permit an infinite lateral adjustment of each carriage on said member 17 to thereby selectively position the wheels to adapt to varying crop row spacings.

A V-shaped hitch frame 18 is pivotally connected to the body 12 and attaches to a tractor drawbar 18a of the tractor 10. Positioned above the frame 18 is a drive shaft assembly generally designated 19 which is operatively connected between the tractor and implement for transmitting power from the tractor to the implement.

Referring more specifically to FIG. 2 which illustrates a power train comprising the drive shaft 19 which connects and delivers power to a power-dividing gear box 20 which in turn drives shafts 21 and 22. The shafts 21 and 22 drive endless belt assemblies generally designated 23 and 24 which in turn drive flail rotors 25 and 26 respectively, wherein each rotor revolves in the same direction.

The flail rotors 25 and 26 are disposed within a rotor housing 60 (FIG. 3) and oriented in a position substantially transverse to the direction of travel. The rotor 25 comprises a tubular rotor body 33 having substantially identical flail knife clusters or units generally designated 70 mounted thereon. The body 33 is rotatably supported on centered end shafts 27, 28 which are securely affixed to the body 33 by means of spacing elements 29. Stub shafts 27, 28 are journalled in bearing assemblies 30, 31 respectively which rotatably support and retain the rotor 25 in position. The bearing assembly 31 is mounted on an intermediate support partition 32 being affixed in a substantial parallel and off of center orientation relative to the side wall 13, 14 within the body 11 to effectively house each rotor in a separate compartment. The bearing assembly 30 is mounted on the outboard side of the side wall 13 which has an opening to allow the shaft 27 to pass therethrough and be journalled in that bearing assembly.

The rotor 26 comprises a body 34 which is also mounted within the housing 60 between the intermediate partition 32 and the side wall 14 in a substantially coaxial orientation with respect to the rotor 25. The rotor body 34 is rotatably carried on end stub shafts and supported within the housing 60 by bearing assemblies in a manner that is operationally and structurally similar to that of the rotor 25. Similarly mounted upon the body 34 are the flail knife clusters 70.

The rotors 25 and 26 have substantially the same structural make-up but differ substantially in length thus producing an unequal transverse division of the housing 60 by the intermediate support partition 32. It should be made clear that the rotors 25, 26 are individually rotatable within their compartments and are separately driven by their respective endless belt drive 23, 24. The use of dual rotors rather than a single rotor of undesirable length has been found to be a practical solution to eliminate problems such as rotor oscillation due to longitudinal flexing of the rotor body and torsional windup. Torsional windup of the rotor is caused when flail knives on a portion of the rotor strike an unmovable object causing the rotor to momentarily twist, immediately thereafter however the rotor unwinds effecting a momentary unloading the power system followed by severe loading and so forth creating pulsations in the power train which shock and produce a harmful transient loading of the power system and power train. The instant invention through the use of shorter dual rotors has for all practical purposes eliminated the above mentioned deficiency inherent in a single long rotor design.

Another advantage of having dual rotors of substantially different lengths wherein each rotor is individually driven is a significant increase in versatility of the implement. For if crop conditions are such that the only available prime mover is unable to furnish sufficient power to both rotors for a particular severe crop condition one of the rotors can be disconnected from the power train, and since the rotors are of different lengths more various crop conditions can be more efficiently accommodated by selection of a maximum rotor length for the power available.

Figure 7B:
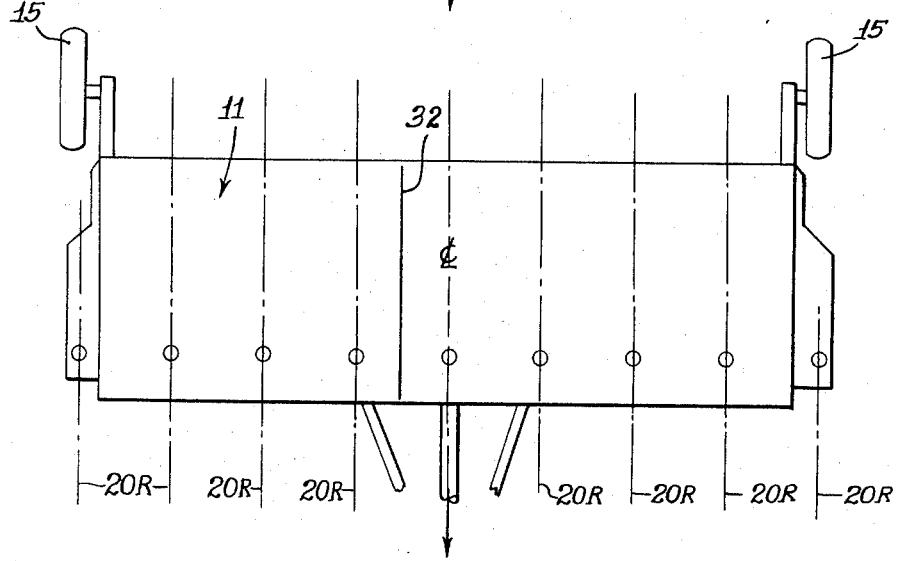
FIG. 7b is a diagrammatic plan view of the shredder shown field oriented in relation to 20 inch crop rows.
Figure 7C:
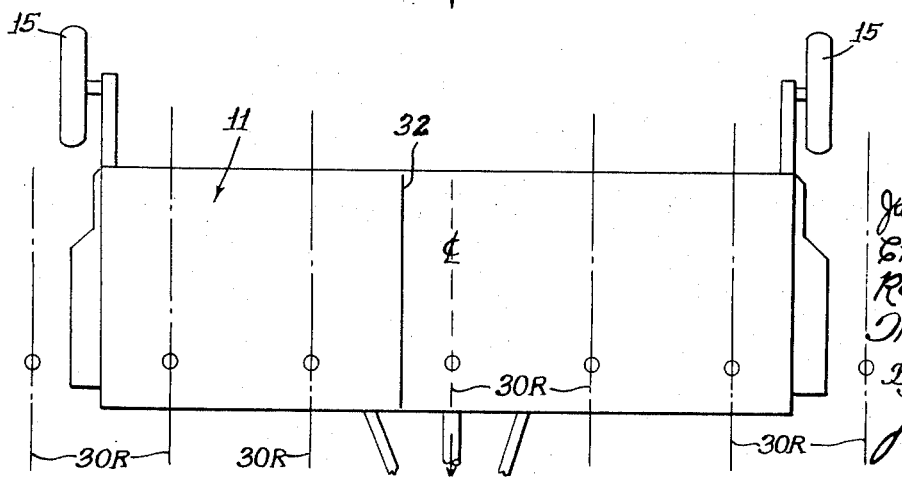
FIG. 7c is a diagrammatic plan view of the shredder shown field oriented in relation to 30 inch crop rows.

One of the novel features incorporated into the instant invention is the asymmetrical location of the intermediate partition 32 which provides support for adjacent ends of the rotors 25, 26. It can be seen in FIG. 2 that the partition 32 has not been placed in the center of housing 60 but rather approximately 10 inches off of center of that housing. This unique positioning provides an increase in field efficiency for various popular crop spacings. FIG. 7a shows the implement with respect to a common 40 inch crop row spacing 40R; here it can be seen that an off-center partition 32 falls between row crop spacing. FIG. 7b and FIG. 7c show the implement used with respect to 20 and 30 inch crop row spacing 20R, 30R respectively; and by arranging the intermediate support partition in an off-center location as featured in the instant implement herein disclosed, an additional crop row can be accommodated in each case. In such heretofore known mowers, the center partition falls on a crop row in 20 and 30 inch crop spacing and therefore the mower has to be offset to miss one row and cannot be centered on the rows to cut a full width.

Recent trends in modern farming have been to narrow row spacing and as a consequence 20 and 30 inch crop row spacings have been becoming increasingly popular. Therefore it is of substantial significance that increases of field efficiency ranging up to 25 percent in 20 and 30 inch crop rows can be realized by use of the instant implement which has a standard width substantially the same as previous machines of this type and comparable mower shredders currently available.

As before mentioned each of the rotors 25, 26 are separately driven by the endless belt drives 23, 24 respectively. The drives 23, 24 are substantially identical in make-up and operation, and therefore only drive 23 will be described in detail, and any descriptions relating to the drive 23 will in substance equally apply to the drive 24. Turning attention to FIG. 4 the drive 23 is enclosed by a protective housing 40 having a removable cover 41 which is shown cut away for the purpose of displaying certain driving components of the drive. The driving components comprise a multi-belt pulley 42 keyed onto the end of the end shaft 27 of the rotor 25. Forwardly and upwardly is another multi-belt pulley 43 keyed onto the end of drive shaft 21 which protrudes through the side wall 13 and journalled in a bearing assembly 36 mounted thereon (See FIG. 2). Two endless V belts 44 are trained about the pulleys for transmitting power from the shaft 21 to the rotor 25.

Between the pulleys 42, 43 is mounted a tension correcting assembly generally designated 45 which engages the belts 44 to maintain at all times proper belt tension which is operative to dampen power pulsations and minimize the undesirable effects of shock loading and thereby provide more uniform power to the rotor. Assembly 45 comprises a fixed bracket 46 rigidly secured to the side wall 13. Swingably retained to the fixed bracket 46 by shouldered bolt 47 is pivotal element 48 which rotatably retains a multi-belt idler pulley 49 in lateral alignment with the driving pulley 42, 43 for engagement with the belts 44. Opposite the idler pulley 49 on the element 48 and pivotally secured thereto is one end of a spring loaded rod 50. The rod passes through a cylindrical casing 51 which retains therein one end of a compression spring 52 by end element 53. The casing 51 passes through a wall of the housing 40 and is securely affixed thereto. The other end of the rod 50 is threaded and a washer 54 of suitable size is passed over the rod and is disposed in the casing 51 to engage the other end of the spring 52. A spacer 55 and nuts 56 are also placed on rod 50 as shown. As the nuts 56 are threaded onto the rod 50, the spacer 55 engages the washer 54 while allowing the nuts to remain outside of the casing 51 to be accessible for adjustment. Further tightening of the nuts cause a compression of the spring 52 which in turn reacts against end element 53 to create a force on the rod as indicated by arrow 'A.' This force transmitted to pivotal element 48 by the rod and consequentially creates an adjustable tension on the belts 44 through idler pulley 49. Arrows 'B' indicate the direction of the belts 44 during operation. It can be readily appreciated that during normal operation the advance run of the belts 44 between the pulleys 42, 43 will not be as taut as that of the return run with or without a tension correcting assembly. If tension correcting assembly 45 were not used and the pulley 42 of the rotor 25 reflects a sudden momentary heavy load of that rotor the portion of the belt at the advance run becomes slack while the belt portion at the return run becomes taut to the point of stretching; from the start of the load period the slack portion would substantially disengage and cause the pulley 42 to excessively slip and then when the load is released pulley 42 would suddenly engage again. This occurrence produces an attenuating oscillatory power demand lasting relatively long after the actual load has been removed. The instant invention corrects this by providing automatically on the slack portion of the belt run a nearly constant belt tension during shock loading to minimize belt stretching and to maintain the belts in driving engagement with the pulley 42 to prevent excessive slippage and attendant oscillatory loading. Another advantage inherent in above mentioned assembly is more uniform power transfer performance throughout the life of the driving belts.

Referring to FIG. 3 the rotor 25 is shown in relation to the housing 60 which is structurally supported within the body 12 by transverse support elements 61, 62, 63 which are coextensive with housing 60 between the side walls 13 and 14 and being securely attached thereto and enclosing the drive shafts 21 and 22. The housing 60 comprising a forwardly extending stiffening portion 64 secured to support elements 62, 63, and a curved segment 65 which merges into a downwardly and rearwardly extending straight terminal segment 66 which terminates in an inwardly extending lip 67 wherein each portion 65, 66 and 67 have a longitudinal extent between the side walls 13 and 14. The curve and straight segments 65, 66 define a transverse concavity in which the rotor operates. As best seen in FIG. 3 the rotor 25 with flail knife clusters 70 mounted thereon is shown with flail knives 71 extended outwardly to illustrate their operative position inducing an attendant periphery of the knives as the rotor turns at high speeds. In FIG. 3 the flail knife clusters succeeding the first three have been deleted for clarity. It should be noted that the rotor is driven in a counterclockwise direction thus causing the flail knives 71 to have a direction at their lowest extent substantially the same as that of the implement, thereby effectively adding the ground speed of the implement to the tangential speed of the knives to maximize shearing impact with the crop. The curved segment 65 extends from line C—C around to line D—D and defines a segment of a circle having its center at point X. The periphery of the flail knife circumscribes a circle having its center at point Y which is necessarily coincidental with the center of rotor 25. Inside the concavity at line C—C a shear bar 68 is longitudinally affixed to curved portion 65 to provide a shearing surface 69 along its downwardly and inwardly facing edge. It should be noticed that the rotor is disposed eccentrically with respect to the curved portion 65 by arranging the center point Y of the rotor forwardly and downwardly to that of the center point X of the curved segment 65. A clearance of approximately three-fourths inch between the peripheral circle of the extended knives 71 and the shearing surface 69 of the shear bar 68 has been provided to control the size of the comminuted material. The peripheral circle of the flail knives has a radius in the range of from 10 to 20 percent less than the radius of the curved segment 65; this combined with the eccentric relationship between the rotor 25 and segment 65 it is seen that the segment 65 takes the form of substantially, an involute curve oriented about the rotor center Y. The effect of this eccentric relationship is an increasing volumetric clearance between the peripheral circle of the knives and the housing 60 from the shear bar 68 upwardly and then downwardly guiding the crop in a rearward direction. Initially the flail knives 71 impact with the crop as they swing across the ground, thus severing that portion of the crop within the knives swath. The severed crop is carried upwardly toward the shear bar 68 by both a force imparted to it by the knives and a substantial air flow caused by the rotor and attached knife clusters 70 rotating at high velocities within the enclosing housing 60. Most of the severed crop is initially comminuted by direct coaction of the knives and the shear bar. Further comminution is effected in a recutting region as shown as shaded area 90 in FIG. 3 which bends upwardly and slightly rearwardly where the knives repeatedly pass through the severed crop as it courses upwardly and rearwardly in the initial curved portions of the housing 60. It can be seen however that at the rearward portions of segment 65 the increasing clearances between that segment and the peripheral circle of the flail knives provides an increasing space 91 adjacent the path of the flail knives for the comminuted crop to course, free of the knives, thus allowing the swingable flail knives 71 to recover from the comminuting process and resume an extended radial attitude as they rotate downwardly and then forwardly for impact with the standing crop in front thereof. The comminuted crop however tends to follow the walls of housing 65 and egress from that housing in a direction substantially parallel and contiguous to the straight segment 66. The lip 67 disposed in the path of the mass of egressing comminuted crop serves to decelerate the mass and create a turbulence in an area about the lip to effectively reduce the exit velocity of the discharging crop thus substantially reducing the production of excessive ground dust so prevalent in machines of this type.

Since particle velocities through the housing 60 are very high there is an additional safety feature in the unique disposition of the support element 61 and 62 in alignment with the operator, that is in the upper forward quadrant of the instant implement. By this arrangement it is contemplated that these support elements will act as baffles to trap any foreign particles that perchance would pierce and penetrate the space between the forward portion, the housing 60 and said elements.

As hereinbefore mentioned the flail knives 71 are swingably mounted in clusters about the rotor. Referring to FIGS. 5 and 6, each flail knife cluster comprises a V shaped housing 72 having a rounded apex 73 with a curved inner surface 74, and a plurality of flail knife receiving slots 75 with substantially equal spacing therebetween through the housing 72 and substantially normal to the apex 73. Each slot 75 receives one end of a reversible pair of complementary disposed flail knives 71, with each knife having reversely sharpened bent cutting portion on one end and an opening at the other end which receives therethrough a rod 76. The rod passes through each knife opening thereby retaining each knife swingably in its respective slot 75. The rod 76 has a greater length than the longitudinal extent of the housing 72 and is arranged to protrude from each end of that housing. Over each rod end is placed an end plate 77 which has an opening 78 to receive the rod 76 and position the rod contiguous with the inner curved surface 74. The rod 76 is retained from lateral motion by retaining pins 79 disposed through each of the outboard ends of the rod. The end plate 77 has a curved shape at one end which is adjacent and complementary to the rotor and is positioned within an end notched portion 80 of the housing 72 wherein both the curve end and the notched portion 80 cooperate to prevent rotation of the end plate which, if allowed, would produce unnecessary wear. It should be pointed out that the rod is loosely retained in position to allow natural rotation of the rod 76 in order that the rod can wear evenly about the surfaces in contact with the flail knives to maximize life of the parts. It also should be noticed that the slots 75 adjacent each end of housing 72 are unequally spaced from the respective ends to allow the rod 76 to be turned end to end and repositioned within the housing thus providing for unworn surfaces of the rod to register with the slots 75 and thereby contact the knives to effect a doubling of rod life.

The clusters or units 70 are mounted on the rotor and affixed thereto by welds 81. Circumferentially adjacent clusters are angularly arranged about the rotor at substantially 120° spaced relation to each other to form a circumferential group of three clusters (see FIG. 3). However each cluster within the group has a progressive lateral or axially spaced relation to the other clusters within that group to provide an overlapping cutting relationship of the flail knives within that group. The complete rotor comprising segments 25, 26 carries a series of the groups as hereinbefore described arranged in axial spaced relation to each other to provide axially nesting helices to effect an overlapping cutting relationship with adjacent groups, and where the groups are progressively angularly shifted approximately 40° about the rotor with respect to adjacent groups to effect a helicoidal pattern of the clusters 70 about the rotor. This modular approach of arranging flail knives into clusters lends itself to arranging the knives in a basic spiral pattern to effect an increase in cutting efficiency and more uniform cutting characteristics, and yet at the same time eliminate the expense and maintenance drawbacks inherent in individual mounting of flail knives either singly or in pairs; for knife replacement can be easily accomplished by simply removing one of the retaining pins 79, the rod 76 of any cluster can be slid axially into the open space between clusters of an axially adjacent group which is due to the 40° displacement between the groups.

Field testing of the instant implement incorporating the combination of features hereinbefore described has shown that the average horsepower requirements are about 20 percent less than that of comparable shredder mowers presently available. The tests have shown that the combination of features namely dual rotors having helicoidally arranged flail knives driven by a tension correcting endless belt drive within a housing having a region of comminution followed by volumetric clearance in order that the shredded crop can egress relatively free of the flail knives and the rotor-supporting partition spaced from center have resulted in the instant implement which demands less and obtains more uniform horse power consumption with an increased field efficiency in the 20 and 30 inch crop row situations.

What I claim is:

1. In a mower having a mobile frame for traveling through crops, a flail rotor mounted on said frame for rotation thereon, a drive train mounted on said frame and operative to transmit power to drive said rotor by rotating the same in a direction moving its forward side upwardly to carry material cut thereby over the rotor for discharge behind the rotor, the improvement comprising: flail knife units axially seriately mounted on said rotor in a helical pattern thereabout; a housing mounted on said frame and partially enclosing said rotor along its longitudinal extent, said housing having an open bottom and defined by front, upper and rear portions covering and opposing corresponding portions of the rotor, said front portion having a lower edge spaced closely to the path of the knife units and immediately arcuately gradually receding from said path and merging in a continuous curve into the upper portion which further recedes away from the path, said upper portion merging into the rear portion in an area above the axis of rotation of the rotor, and said rear portion extending from its juncture to a lower edge below said axis in a plane diverging downwardly further away from said path and providing a space accommodating the cut crop outside said path and guiding the crop downwardly and rearwardly toward the ground.

2. The invention according to claim 1 and said rotor comprising two sections of substantially different lengths disposed in coaxial end to end relationship, and a support element asymmetrically disposed between the ends of said rotor housing to provide a common support for adjacent ends of said segments, said asymmetrical disposition of said support accommodating positioning the same between rows of row crops to maximize the effective cutting width of the rotor.

3. The invention according to claim 1 and said flail knife units each comprising an elongated V shaped holder mounted on said rotor and having the vertex portion axially disposed in radially spaced relation to said rotor, said holder having a plurality of juxtaposed slots through said vertex portion disposed transversely thereof to receive sets of said knife units therein, and means swingably retaining said sets of knife units in their respective slots.

4. The invention according to claim 3 and said retaining means of each flail knife unit comprising a rod extending through said holder and disposed adjacent said slots and in operative connection with said sets of knife units disposed in their respective slots to swingably retain them therein, and said slots having a different spaced relation with respect to the ends of said holder whereupon an end to end repositioning of said rod with respect to said holder will result in different wear surfaces of said rod to register with said slots.

5. The invention according to claim 4 and each said knife set comprising a reversibly positionable pair of elongated and substantially identical knives each having a shank with a bent cutting portion on one end having reversely sharpened edges and an aperture at the other end to receive said rod therethrough.

6. The invention according to claim 1 and said housing having a rearwardly disposed terminal portion merging with said arcuate portion, and said rear portion terminating at said lower edge in an inwardly extending crop-impinging turbulence-creating lip effective to substantially slow the egress of the crop from said housing.

7. The according to claim 6 and said terminal portion having a substantially straight extent extending from said peripheral path rearwardly and downwardly substantially tangent to the upper rearward quadrant of said path.

8. For use in crops including row crops which are arranged in substantially uniformly spaced rows, a mower comprising a mobile frame, a pair of driven flail rotors of different lengths journaled on said frame in end to end relationship to define a transverse cutting range of said mower, a rotor housing covering upper portions of said rotor, a support element mounted within said housing journaling adjacent ends of said rotors, the rotors being of such lengths as to straddle a maximum number of rows and having said support element asymmetrically located between the ends of the housing for positioning between rows.

9. The invention according to claim 8 and said mower having an extensive transverse extent, and ground engaging wheels adjustably positionable along that extent to adapt said mower to various crop row spacings.

10. The invention according to claim 8 wherein said housing comprises a surface having an arcuate concave contour disposed about the axis of said flail rotors, flail knives attached to each of said rotors in radial extension therefrom and being driven in a peripheral path about the axis of their respective rotor within said contour, said housing comprising a forward segment defining a comminuting region from the leading edge of said housing to approximately the top of the rotor, and a rearward segment extending from said forward segment and curving about the upper rear quadrant of the rotor and then extending in a rearwardly diverging downward direction away from said path to define a radially progressively increasing space in the direction of crop flow to accommodate comminutated crops moving free of said knives with a rearward impetus against the adjacent housing portion and slide along the rear segment in a downward and rearward direction.

11. A flail mower having a mobile frame adapted to travel through crops in a predetermined direction, a housing mounted on said frame, a support member mounted on said housing and asymmetrically disposed from the ends thereof, a driven rotor journaled on said frame within said housing in a disposition generally transverse to the direction of travel, said rotor comprising first and second segments having adjacent ends thereof mounted on said support member, a plurality of knife units mounted in axial disposition on said first and second segments of said rotor, and said units mounted in helicoidal pattern about the periphery of said rotor, the location of said support member being such as to be positionable between rows of crops to accommodate said mower to straddle a maximum member of rows.

* * * * *